United States Patent [19]

Malloy

[11] 3,757,607

[45] Sept. 11, 1973

[54] MULTI-SPEED TRANSMISSION
[75] Inventor: John D. Malloy, Troy, Mich.
[73] Assignee: General Motors Corporation, Detroit, Mich.
[22] Filed: June 27, 1972
[21] Appl. No.: 266,540

[52] U.S. Cl. ................................................. 74/761
[51] Int. Cl. ............................................ F16h 57/10
[58] Field of Search ............................... 74/759-761

[56] References Cited
UNITED STATES PATENTS
2,697,367 12/1954 Winther ................................. 74/761
2,827,805 3/1958 Miller .................................... 74/761
2,901,923 9/1959 Waclawek ......................... 74/761 X
3,209,620 10/1965 Moan ................................. 74/761 X Primary Examiner—Arthur T. McKeon
Attorney—W. E. Finken, D. F. Scherer et al.

[57] ABSTRACT

A multi-speed transmission having a compound planetary gearing arrangement with an input reaction ring gear, a reaction ring gear, an input sun gear and a reaction sun gear. The ratio ($R_1/R_2$) of the pitch diameters of the input reaction ring gear to the reaction ring gear is greater than 1.00 and the ratio ($S_1/S_2$) of the pitch diameters of the input to reaction sun gears is less than 1.00. This relationship permits the transmission to have substantially equal output speed steps in the forward speed ratios or a combination geometric-constant output speed step.

6 Claims, 3 Drawing Figures

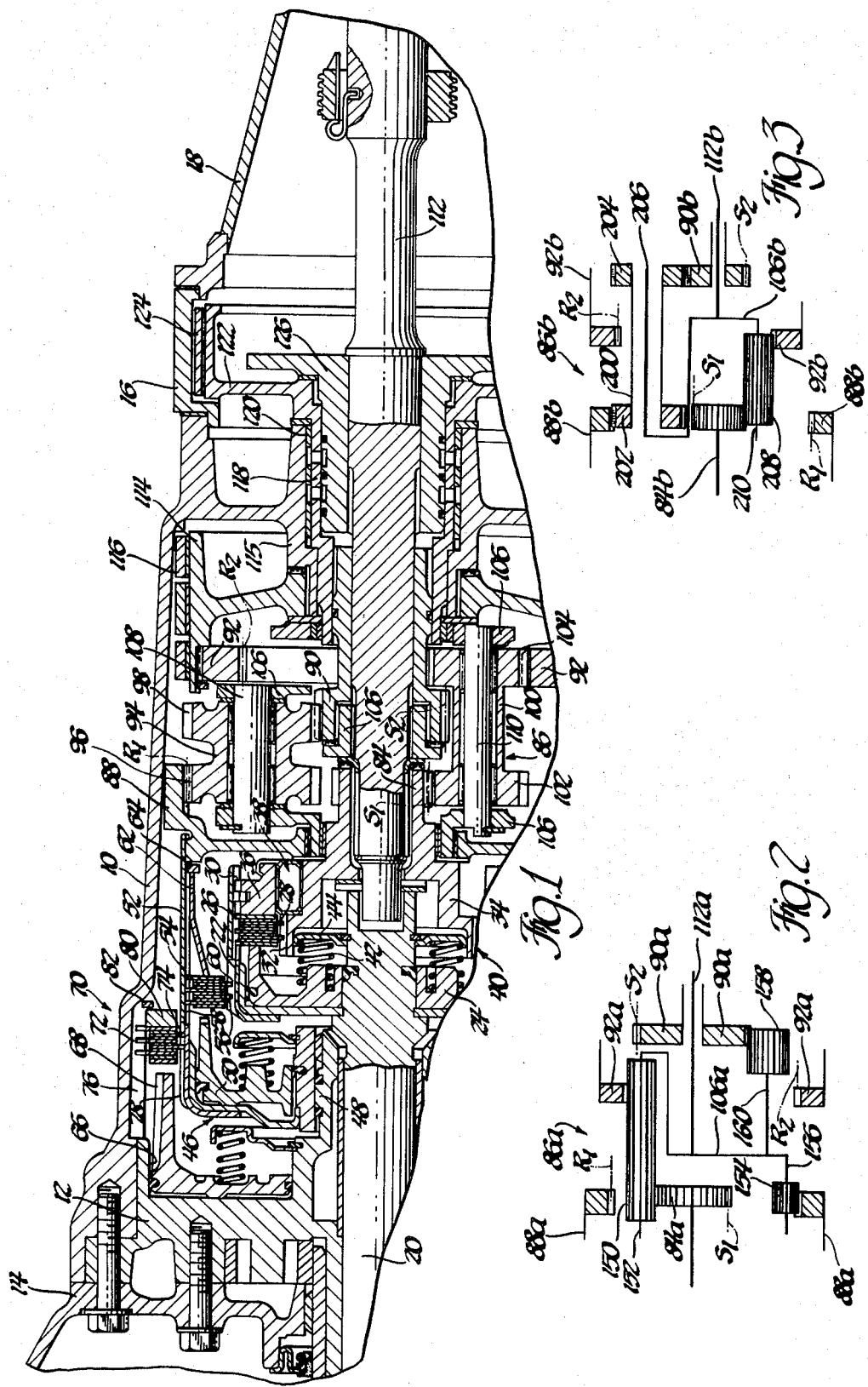

MULTI-SPEED TRANSMISSION

This invention relates to planetary gearing arrangements and more particularly to planetary gearing arrangements providing multiple speed ratios with constant output speed steps or combination geometric and constant output speed steps.

The present invention utilizes two input clutches and three reaction brakes in combination with a compound planetary gearing arrangement to produce four or five forward speed ratios and one reverse speed ratio between the input and output shafts of the transmission. The planetary gearing arrangement includes an input sun gear and a reaction sun gear with the ratio of their respective pitch diameters being less than one (1.00) and an input-reaction ring gear and a reaction ring gear with their respective pitch diameters having a ratio greater than one (1.00). The input sun gear and the reaction ring gear are drivingly connected through a planet pinion which is rotatably mounted in a carrier and the input-reaction ring gear and the reaction sun gear are also drivingly connected to pinion gears which are rotatably mounted in the carrier and also mesh with the first mentioned planet pinions. By maintaining the pitch diameter ratios discussed above, it is possible to obtain five forward speed ratios which have equal output speed steps at a constant upshift input speed in each of the forward gear ratios.

It is, therefore, an object of this invention to provide an improved five speed planetary gearing arrangement. Another object of this invention is to provide an improved five speed gearing arrangement wherein the output speed steps in the ratios are substantially constant.

Another object of this invention is to provide an improved five speed transmission having a compound planetary gearing arrangement in which the ratio of the pitch diameter of the input-reaction ring gear to the pitch diameter of the reaction ring gear is greater than 1.00 and the ratio of the pitch diameter of the input sun gear to the pitch diameter of the reaction sun gear is less than 1.00.

Another object of this invention is to provide an improved multi-speed transmission having a compound planetary gearing arrangement with two sun gears, two ring gears, and three inter-meshing planet gears in which the ratio of the input-reaction ring gear pitch diameter to the reaction ring gear pitch diameter is greater than 1.00 and the ratio of input sun gear pitch diameter to the reaction sun gear pitch diameter is less than 1.00, and wherein the speed ratios are controlled to provide a geometric step ratio between the lower speed ratios and a constant output speed step in the higher speed ratio.

These and other objects and advantages of the present invention will be more apparent from the following description and drawings in which:

FIG. 1 is a cross-sectional elevational view of a transmission embodying the invention;

FIG. 2 is a schematic drawing of an alternate form of the planetary gearing arrangement; and FIG. 3 is a schematic representation of another alternate planetary gearing arrangement.

Referring to the drawings and particularly to FIG. 1, there is shown a transmission having a stationary housing 10 to which is secured a pump housing 12, a bell housing 14 and two extension housings 16 and 18. An input shaft 20 is rotatably journaled in the pump housing 12 and is adapted to be driven by a turbine member of a conventional torque converter, not shown. A sheet metal drum 22 is secured to the input shaft 20 and houses a slidable fluid operated clutch piston 24. Also disposed in the sheet metal drum 22 are a plurality of spaced friction plates 26 and 28 alternately splined to internal splines 30 on the sheet metal drum 22 and splines 32 on an input sun gear hub 34 respectively. A backing plate 36 is also splined to the sheet metal drum 22 and forms the outer race for a one way clutch 38, the inner race of which is formed on the input sun gear hub 34. The piston 24 cooperates with the friction plates 26 and 28 and the backing plate 36 to form an input clutch generally designated 40. The piston 24 is urged to the disengaged or retracted position by a plurality of return springs 42 which are compressed between the piston 24 and a retainer plate 44 located on the input shaft 20.

A second input clutch 46 is slidably mounted on an extension 48 of the pump housing 12 and includes a fluid operated piston 50 slidably disposed in a clutch drum 52, a plurality of plates 54 and 56 alternately splined to inner splines 58 on the clutch drum 52 and outer splines 60 on the sheet metal drum 22 respectively and a backing member 62 located about a portion of the inner periphery of the clutch drum 52 by a retainer ring 64.

The pump housing 12 also has formed therein an annular piston chamber 66 in which is slidably disposed a piston 68 which is a component of a reaction brake 70. The reaction brake 70 also includes a plurality of friction plates 72 and 74 alternately drive connected to splines 76 on the transmission housing 10 and outer splines 78 formed on the clutch drum 52 respectively and a backing plate 80 located in the housing 10 by a retainer ring 82. The clutches 40 and 46 and the brakes 70 are similar in construction to the clutches and brakes shown in U. S. Pat. No. 3,554,057 issued to Michnay et al on Jan. 12, 1971, wherein a more detailed description of these friction devices can be seen.

The sun gear hub 34 has integrally formed thereon or otherwise secured thereto an input sun gear 84 which is a component in the planetary gearing arrangement generally designated 86. The planetary gearing arrangement 86 also includes an input-reaction ring gear 88 splined to the clutch drum 52, a reaction sun gear 90, a reaction ring gear 92, a plurality of pinion gears 94 having gear portions 96 and 98 formed thereon and meshing with input-reaction ring gear 88 and reaction sun gear 90 respectively, a plurality of pinion gears 100 having gear portions 102 and 104 formed thereon and meshing with input sun gear 84 and reaction ring gear 92 respectively, and a planet carrier 106 which has secured therein a plurality of pins 108 and 110 on which are rotatably mounted pinion gears 94 and 100, respectively. The carrier 106 is splined to an output shaft 112 thereby providing a driving connection between the planetary gearing arrangement 86 and the output shaft 112.

The reaction ring gear 92 is secured to a brake hub 114 which is rotatably mounted on a portion 115 of the transmission housing 10 and cooperates with a double wrapped band 116 to form a friction brake for the reaction ring gear 92. The double wrapped band 116 may be constructed similar to that shown in Vossler et al, U. S. Pat. No. 2,975,870. The reaction sun gear 90 is drivingly connected to a hollow shaft 118 which is rotatably journaled in a bushing 120 secured in the transmission housing 10. A brake drum 122 is formed on the hollow shaft 118 and cooperates with a conventional brake band 124 located within the extension housing 16 to provide a reaction brake for the reaction sun gear 90. The output shaft 112 is also rotatably supported in the transmission housing 10 through a governor flange 126 which is journaled in the hollow shaft 118 and in a bushing, not shown, in the extension housing 18. The governor flange 126 is adapted to have mounted thereon a conventional governor assembly which will provide a vehicle speed signal to accommodate automatic shifting of the transmission. The various clutches and brakes in the transmission are preferably of the fluid operated type and may be controlled by any of the presently available hydraulic control systems designed for controlling five speed transmissions.

To operate the transmission in first gear forward the double wrapped band 116 is energized while the one way clutch 38 provides a drive connection between the input shaft 20 and the input sun gear 84. With the reaction ring gear 92 established as a stationary member in the transmission, a reduction drive is accomplished between the input sun gear 84 and the carrier 106 through the action of the pinion gears 100.

To establish second gear foward the double wrapped band 116 is de-energized while the band 124 is energized thus establishing a reaction sun gear 90 as a stationary component in the transmission. The input drive to the planetary gearing is again through the one way clutch 38 to the input sun gear 84. The drive ratio between the input sun gear 84 and the carrier 106 is a reduction drive accomplished through the action of the pinion gears 100 and 94.

Third gear forward is established in the transmission by de-energizing the band 124 while the double wrapped band 116 is energized and the clutch 46 is energized. The energization of the double wrapped band 116 again establishes the reaction ring gear 92 as a stationary component in the planetary gearing arrangement 86 and the engagement of clutch 46 establishes the input reaction ring gear 88 as an input member. A reduction drive from the ring gear 88 to the carrier 106 is accomplished through the action of the pinion gears 94 and 100. When the ring gear 88 is driven by the input shaft 20, the sun gear 84 is driven forwardly at a speed higher than the input shaft 20 through the gear portions 96 and 102 of the pinion gears 94 and 100 respectively so that the one way clutch 38 is over-running and there is no drive connection between the input shaft 20 and the input sun gear 84.

To establish fourth gear forward the clutch 46 remains engaged while the band 116 is de-energized and the band 124 is energized thus establishing the reaction sun gear 90 as a stationary component in the planetary gearing arrangement 86. The carrier 106 is driven fowardly at a reduced speed through the reaction of the pinion gears 94. Also in fourth gear the one way clutch 38 is in the over-running condition.

To establish fifth speed forward the brake band 124 is de-energized while the clutch 40 is energized and the clutch 46 remains energized. With both clutches 40 and 46 energized the planetary gearing arrangement 86 is locked up thus providing a 1:1 drive ratio between the input shaft 20 and the output shaft 112.

To establish reverse drive the brake 70 is engaged, while all other brakes and clutches are disengaged. The input to the planetary gearing is through the one way clutch 38 to the sun gear 84. The input-reaction ring gear 88 is the reaction member for the gearing. The carrier 106 is thus driven reversely through the action of gear portions 102 and 96 on pinion gears 100 and 94 respectively.

If engine braking is desired during the first, second or reverse drives, the clutch 40 can be engaged to provide a positive input drive to the planetary gearing in parallel with the one-way clutch 38.

As can be seen in the drawing, the pitch diameter $R_1$ of the ring gear 88 is larger than the pitch diameter $R_2$ of the ring gear 92. The ratio of these pitch diameters $R_1/R_2$ is greater than 1.00. It should also be noted that the pitch diameter $S_1$ of the sun gear 84 is less than the pitch diameter $S_2$ of the sun gear 90. The ratio of these pitch diameters $S_1/S_2$ is less than 1.00. Maintaining these ratios it is possible to obtain the five forward speeds described above.

The planetary gearing arrangement 86a shown in FIG. 2 also provides five forward speeds and a reverse speed by selectively engaging and disengaging drive devices connected to the various gear components. The gearing arrangement 86a is similar to the gearing arrangement 86 such that similar or corresponding components are given the same numerical designation with an "a" suffix. The planetary gearing arrangement 86a has an input sun gear 84a, an input-reaction ring gear 88a, a reaction sun gear 90a, a reaction ring gear 92a and a planet carrier 106a. A plurality of single diameter pinion gears 150 are rotatably mounted on pins 152 secured in the carrier 106a and mesh with the input sun gear 84a and the reaction ring gear 92a. A plurality of pinion gears 154 are rotatably mounted on pins 156 secured to the carrier 106a and mesh with the input-reaction ring gear 88a and the pinion gears 150. A plurality of pinion gears 158 are rotatably mounted on pins 160 secured to the planet carrier 106a and mesh with the reaction sun gear 90a and with the pinion gears 150. Clutches and brakes similar to those described above for FIG. 1 can be operatively connected to the planetary gearing arrangement 86a to provide the five forward speeds and reverse speed in the same sequence of operation as described for FIG. 1.

Another alternative planetary gearing arrangement 86b is shown in FIG. 3. This planetary gearing arrangement 86b also has components similar to those described above for FIG. 1 so that the corresponding parts have been given the same numerical designation with a "b" suffix. The planetary gearing arrangement 86b has an input sun gear 84b, an input-reaction ring gear 88b, a reaction sun gear 90b, a reaction ring gear 92b, and a planet carrier 106b. A plurality of pinion gears 200 having gear portions 202 and 204 meshing with the input-reaction ring gear 88b and reaction sun gear 90b respectively are rotatably mounted on pins 206 secured to the carrier 106b. A plurality of single diameter pinion gears 208 are rotatably mounted on pins 210 secured to the planet carrier 106b and mesh with the input sun gear 84b, the reaction ring gear 92b and the gear portion 202 of the pinions 200. The planetary gearing arrangement 86b is controlled by clutches and brakes in a manner similar to that described above for FIG. 1 such that five forward speeds and a reverse speed are accomplished by selectively engaging the drive devices in the same sequence as described above for FIG. 1.

In both FIGS. 2 and 3 the ratio $R_1/R_2$ is greater than 1.10 and the ratio $S_1/S_2$ is less than 1.00.

The following example describes the number of gear teeth on the gears and the gear ratios which are established by the gearing when these numbers of gear teeth are used. The example also shows that there is a substantially constant output speed step in each of the forward gear ratios when the constant input upshift speed is maintained.

EXAMPLE I

| | Number of Teeth | |
|---|---|---|
| Sun Gear 84 | 20 | |
| Ring Gear 88 | 161 | $S_1/S_2 = 0.80$ |
| Sun Gear 90 | 25 | $R_1/R_2 = 1.66$ |
| Ring Gear 92 | 61 | |

| | Input/Reaction | Ratio | Output Speed Step at 4000 RPM Input at Upshift |
|---|---|---|---|
| 1st Gear | 84/92 | 4.05 | — |
| 2nd Gear | 84/90 | 2.25 | 790 |
| 3rd Gear | 88/92 | 1.604 | 712 |
| 4th Gear | 88/90 | 1.248 | 720 |
| 5th Gear | — | 1.00 | 790 |
| Reverse | 84/88 | 4.05 | |

The use of these equal output speed steps permits the transmission to be coupled with a low power prime mover without permitting performance gaps in the upper speed ranges. If the gear ratios are established in a geometric pattern, as normally occurs with high powered prime movers, the gear ratios and output speed steps would be as shown in the following example.

In some instances where an automatic transmission is used with a low power to weight ratio vehicle and in light and medium weight trucks, it is desirable to have a small output speed step in the lower speed ratios and a larger output speed step in the higher speed ratios. This arrangement provides optimum performance coverage in these applications. This is accomplished by providing a geometric step or constant input speed range in second and third gear and a constant output speed step in third and fourth. By eliminating the above described third gear ratio a combination of a geometric-constant output speed steps can be accomplished. Thus, a four speed transmission is provided. The following example describes the number of gear teeth used and the gear ratio which are provided.

EXAMPLE II

| | Number of Teeth | |
|---|---|---|
| Sun Gear 84 | 26 | |
| Ring Gear 88 | 84 | $S_1/S_2 = 0.84$ |
| Sun Gear 90 | 31 | $R_1/R_2 = 1.25$ |
| Ring Gear 92 | 67 | |

| | Input/Reaction | Ratio | Step Ratio | Output Speed Step at 4000 rpm input at upshift | Input Speed Change in this ratio |
|---|---|---|---|---|---|
| 1st Gear | 84/92 | 3.58 | | — | 4000 |
| | | | 1.63 | | |
| 2nd Gear | 84/90 | 2.19 | | 705 | 1550 |
| | | | 1.60 | | |
| 3rd Gear | 88/90 | 1.37 | | 1095 | 1500 |
| | | | 1.37 | | |
| 4th Gear | — | 1.00 | | 1080 | 1080 |
| Reverse | 84/88 | 2.23 | | | |

As seen from the above example the step ratios between first gear and second gear and between second and third are substantially equal, indicating a geometric step, while the output speed steps during third gear and fourth gear are substantially equal, indicating a constant output speed. It should also be noted that the input speed change during second gear and third gear are substantially equal. This is typical of a geometric step ratio transmission.

EXAMPLE III — GEOMETRIC

| | Ratio | Step Ratio | Output Speed Step at 4000 rpm input at upshift | Input Speed Change |
|---|---|---|---|---|
| 1st Gear | 3.91 | | | 4000 |
| | | 1.406 | | |
| 2nd Gear | 2.77 | | 400 | 2840 |
| | | 1.406 | | |
| 3rd Gear | 1.977 | | 600 | 2840 |
| | | 1.406 | | |
| 4th Gear | 1.406 | | 820 | 2840 |
| | | 1.406 | | |
| 5th Gear | 1.000 | | 1160 | 2840 |

As can be seen from the above example, the output speed steps become increasingly larger as the transmission progresses through the speed ratios.

Obviously, many modifications and variations of the present invention are possible in light of the above teachings. It is, therefore, to be understood that within the scope of the appended claims the invention may be practiced otherwise than as specifically described.

What is claimed is:

1. A multi-speed transmission comprising an input shaft; an output shaft; and compound planetary gearing means selectively operable for providing five forward speed ratios having substantially equal output speed steps in the speed ratios and a reverse ratio between said shafts including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon and meshing with said input-reaction ring gear and said reaction sun gear and second pinion means rotatably mounted thereon and meshing with said input sun gear, said reaction ring gear and said first pinion means, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

2. A multi-speed transmission comprising an input shaft; an output shaft; and compound planetary gearing means selectively operable for providing five forward speed ratios having substantially equal output speed steps in the speed ratios and a reverse ratio between said shafts including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon and having a first gear portion meshing with said input-reaction ring gear and a second gear portion meshing with said reaction sun gear and second pinion means rotatably mounted thereon and meshing with said input sun gear, said reaction ring gear and said first gear portion, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

3. A multi-speed transmission comprising an input shaft; an output shaft; and compound planetary gearing means selectively operable for providing five forward speed ratios having substantially equal output speed steps in the speed ratios and a reverse ratio between said shafts including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon and meshing with said input-reaction ring gear, second pinion means rotatably mounted thereon and meshing with said reaction sun gear and third pinion means rotatably mounted thereon and meshing with said input sun gear, said reaction ring gear and said first and second pinion means, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

4. A multi-speed transmission comprising an input shaft; an output shaft; and compound planetary gearing means selectively operable for providing five forward speed ratios having substantially equal output speed steps in the forward speed ratios and a reverse ratio between said shafts including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon having first and second gear portions meshing with said input-reaction ring gear and said reaction sun gear respectively and second pinion means rotatably mounted thereon having a first gear portion meshing with said input sun gear and said first gear portion of said first pinion means, and a second gear portion meshing with said reaction ring gear, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

5. A multi-speed transmission comprising an input shaft; an output shaft; and compound planetary gearing means drivingly connected between said shafts and being selectively operable for providing a plurality of forward speed ratios having a substantially geometric step ratio between the lower speed ratios and substantially equal output speed steps in the higher speed ratios including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon and having a first gear portion meshing with said input-reaction ring gear and a second gear portion meshing with said reaction sun gear and second pinion means rotatably mounted thereon and meshing with said input sun gear, said reaction ring gear and said first gear portion, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

6. A multi-speed transmission comprising an input shaft; an output shaft; and compound planetary gearing means drivingly connected between said shafts and being selectively operable for providing a plurality of forward speed ratios having a substantially geometric step ratio between the first and second speed ratios and substantially equal output speed steps in the third and fourth ratios including an input sun gear having a pitch diameter $S_1$, a reaction sun gear having a pitch diameter $S_2$ sized to have a ratio ($S_1/S_2$) with said input sun gear pitch diameter of less than 1.00, an input-reaction ring gear having a pitch diameter $R_1$, a reaction ring gear having a pitch diameter $R_2$ sized to have a ratio ($R_1/R_2$) with said input-reaction ring gear pitch diameter of greater than 1.00, planet carrier means drivingly connected with said output shaft including first pinion means rotatably mounted thereon and meshing with said input-reaction ring gear, second pinion means rotatably mounted thereon and meshing with said reaction sun gear and third pinion means rotatably mounted thereon and meshing with said input sun gear, said reaction ring gear and said first and second pinion means, first and second selectively operable clutch means for selectively connecting said input shaft to said input sun gear and said input-reaction ring gear respectively, and first, second and third selectively operable brake means for selectively retarding said reaction ring gear, said reaction sun gear and said input-reaction ring gear respectively.

* * * * *